(12) United States Patent
Panchbudhe et al.

(10) Patent No.: US 8,380,687 B1
(45) Date of Patent: Feb. 19, 2013

(54) METHOD AND APPARATUS FOR PROVIDING A MESSAGE TRAIL OF CONVERSATIONALLY RELATED MESSAGES

(75) Inventors: Ankur Panchbudhe, Pune (IN); Angshuman Bezbaruah, Pune (IN); Veeral Shah, Mumbai (IN); Dinesh Jotwani, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 474 days.

(21) Appl. No.: 12/233,861

(22) Filed: Sep. 19, 2008

(51) Int. Cl.
*G06F 17/00* (2006.01)
(52) U.S. Cl. ......... 707/697; 707/803; 715/764; 715/752
(58) Field of Classification Search .................. 715/764, 715/752; 709/206, 203
See application file for complete search history.

(56) References Cited

U.S. PATENT DOCUMENTS

| 7,664,821 | B1 * | 2/2010 | Ancin et al. ................... 709/206 |
| 7,840,400 | B2 * | 11/2010 | Lavi et al. .......................... 704/9 |
| 2008/0189633 | A1 * | 8/2008 | Boyle et al. .................... 715/764 |
| 2009/0210800 | A1 * | 8/2009 | McCann et al. ............... 715/752 |

* cited by examiner

*Primary Examiner* — Belix M Ortiz Ditren
(74) *Attorney, Agent, or Firm* — Wilmer Cutler Pickering Hale and Dorr LLP

(57) ABSTRACT

A method and apparatus for providing a message trail of conversationally related messages is described. In one embodiment, the method for providing a message trail of conversationally related messages includes processing a plurality of messages in a message database and identifying at least two conversationally related messages of the plurality of messages.

20 Claims, 4 Drawing Sheets

METHOD AND APPARATUS FOR PROVIDING A MESSAGE TRAIL OF CONVERSATIONALLY RELATED MESSAGES

BACKGROUND OF THE INVENTION

1. Field of the Invention

Embodiments of the present invention generally relate to an enterprise messaging system and, more particularly, to a method and apparatus for providing a message trail of conversationally related messages.

2. Description of the Related Art

An organization may use an enterprise messaging system to facilitate communication between organization members and/or external resources. For example, the enterprise messaging system may be an email system (e.g., MICROSOFT Exchange) where a plurality of mailboxes is maintained for the organization members at a central mail server (e.g., MICROSOFT Exchange Server). Each client computer used by the organization members to sent email may have a corresponding client application installed (e.g., MICROSOFT Exchange Outlook).

Each mailbox includes a plurality of email messages (e.g., one or more sent messages and one or more received messages). Two or more email messages of the plurality of email messages may be conversationally related to each other. For example, the two or more email messages may be associated with the same conversation or share the same topic of discussion.

Current solutions are limited to discovering conversationally related email messages only by a handful of techniques. For example, a conversation thread includes a chain of conversationally related email messages where each email message is a reply to a previous email message or a forwarded message from the previous email message. Current solutions may only be able to create such a conversation thread if the "REPLY" feature is used. Current solutions, however, cannot recognize a conversationally related email message that is a reply to a previous email message if the "Reply" feature were not used and the organization member simply cut and pasted the body of the previous email message. Furthermore, the current solutions cannot recognize a conversationally related email message that includes the previous email message as an attachment. Moreover, the current solutions cannot recognize a conversationally related email message that conveys similar information as the previous email message.

Therefore, there is a need in the art for a method and apparatus for providing a message trail of conversationally related messages.

SUMMARY OF THE INVENTION

Embodiments of the present invention generally comprise a method and apparatus for providing a conversationally related message trail of conversationally related messages. In one embodiment, the method for providing a message trail of conversationally related messages includes processing a plurality of messages in a message database and identifying at least two conversationally related messages of the plurality of messages.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
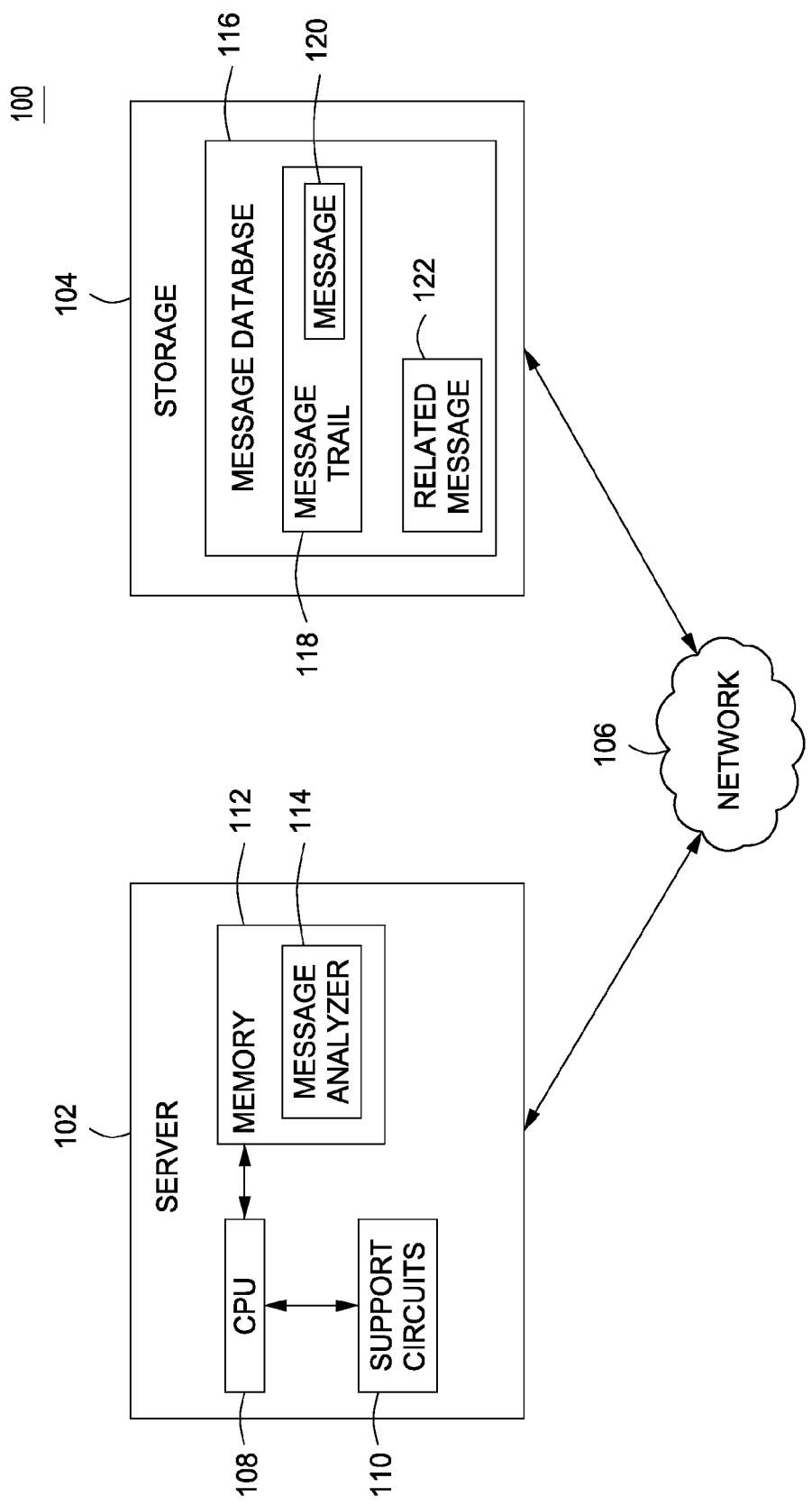
FIG. 1 is a block diagram of a system for providing a message trail of conversationally related messages according to one or more embodiments of the present invention.

FIG. 1 is block diagram of a system 100 for providing a conversationally related message trail according to one or more embodiments of the present invention. In one embodiment, the system 100 includes a server 102 and storage 104 where each is coupled to each other through a network 106.

The server 102 is a type of computing device (e.g., a laptop, a desktop, a Personal Desk Assistant (PDA), a tablet, a mobile phone and the like) that comprises a central processing unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a read only memory, random access memory, disk drive storage, optical storage, removable storage, and the like. The memory 112 includes various software packages, such as a message analyzer 114.

The storage 104 generally includes various components (i.e., hardware and software) that are configured to manage storage resources within a computing environment. The storage 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the server 102.

The storage 104 facilitates permanent storage (e.g., backup, archive) of critical computer data, such as a message database 116 (e.g., MICROSOFT Exchange Database (.edb file), MICROSOFT Exchange Streaming Database (.stm file), transaction logs and/or the like) that includes an index of one or more messages (e.g., emails (.msg files), instant messages and/or the like). In one embodiment, the one or more messages may be archived by archival software (e.g., SYMANTEC Enterprise Vault). Furthermore, the one or more messages of the message database 116 may be associated with one or more mailboxes that store sent and received messages of one or more users.

According to one embodiment, the message database 116 may include two or more conversationally related messages that form a message trail 118. For example, the two or more conversationally related messages may be two or more sent messages (e.g., a sent message that is embedded as an attachment in another sent message). As another example, the two or more conversationally related messages may be two or more received messages (e.g., a received message that pertains to the same topic as a previous received message). In yet another example, the two or more conversationally related messages may be one or more sent messages and one or more received messages (e.g., a sent message that contains text that has been cut and pasted from the received message).

The message database 116 further includes a message 120 and a related message 122. In one embodiment, the message 120 is one of the conversationally related messages in the message trail 118. Furthermore, the related message 122 may be determined to bear a conversational relationship with the message 120. As such, the related message 122 is added to the message trail 118 by the message analyzer 114 as explained further below.

The network 106 comprises a communication system that connects computers by wire, cable, fiber optic, and/or wireless links facilitated by various types of well-known network elements, such as hubs, switches, routers, and the like. The network 106 may employ various well-known protocols to communicate information amongst the network resources. For example, the network 106 may be part of the Internet or intranet using various communications infrastructure such as Ethernet, WiFi, WiMax, General Packet Radio Service (GPRS), and the like.

The message analyzer 114 includes software code that is configured to identify two or more conversationally related messages in order to create the message trail 118. In operation, the message analyzer 114 initially creates the message trail 118 to include the message 120. Subsequently, the message analyzer 114 accesses the message 120. Then, the message analyzer 114 identifies one or more messages in the message database 116 that are conversationally related to the message 120, such as the related message 122. As a result, the message analyzer 114 couples the related message 122 to create the message trail 118.

In one embodiment, the message analyzer 114 processes a conversation thread for a received message (i.e., an email received by a user and stored in an inbox). For example, the message analyzer 114 accesses various properties associated with messaging software (e.g., MICROSOFT Exchange Server) that maintains the message database 114 (i.e., one or more mailboxes), such as a MAPI_CONVERSATION_INDEX property, a SMTP In-ReplyTo property and/or the like. Generally, the conversation thread indicates one or more messages (e.g., sent messages and/or received messages) that are related to the received message. For example, the one or more messages may be replies to the received message (e.g., a reply from any of the recipients including the user associated with the inbox). As such, the conversation thread is created when the user selects "Reply" and creates a message in response to the received message.

Similarly, the message analyzer 114 may process a conversation thread for a sent message (i.e., an email sent by the user and stored in a sent folder of the inbox). If the recipient of the sent message decides to reply to the user, the reply message that is received by the user couples with the sent message to create the conversation thread. Accordingly, the message analyzer 114 initially creates the message trail 118 using the conversation thread of the received message and/or the sent message.

According to one or more embodiments of the present invention, the message analyzer 114 defines a time window (e.g., one hour, one day and/or the like) for identifying at least one message that is conversationally related to the received message and/or the sent message. In one embodiment, the message analyzer 114 examines one or more sent messages (e.g., a "Sent" Folder) in the message database 114 within the time window (e.g., after the data/time of the received email) to determine one or more potentially conversationally related messages for the received message. Alternatively, if the "Sent" folder is not archived, the message analyzer 114 accesses a journal archive to examine the one or more sent messages. In another embodiment, the message analyzer 114 examines one or more received messages (e.g., an "Inbox" Folder) within the time window (e.g., before the date/time of the sent email) to determine one or more potentially conversationally related messages for the sent message.

In one embodiment, the message analyzer 114 identifies one or more messages having duplicated text (e.g., within the one or more potentially conversationally related messages as explained above). For example, the message analyzer 114 determines that one or more sent messages include text that substantially resembles text found in one or more portions of the received message as if the text were copied from the received message (e.g., cut from the received message and pasted onto the one or more sent messages). Furthermore, the copied text may be a partial duplication of the received message (e.g., one or more sentences or a paragraph). The message analyzer 114 may utilize one or more natural language algorithms (e.g., n-grams, shingling and/or the like) to identify the one or more messages having duplicated text. Alternatively, the message analyzer 114 applies a paragraph based hashing technique to identify the messages having duplicated text.

In another embodiment, the message analyzer 114 identifies one or more messages associated with a same cluster. For example, the message analyzer 114 determines that one or more received messages share a similar concept with the sent message (e.g., same subject, keywords, patterns and/or the like). The message analyzer 114 may apply a concept based clustering algorithm on the potentially conversationally related messages to identify the one or more messages associated with the same cluster.

In yet another embodiment, the message analyzer 114 examines attachments of the one or more potentially conversationally related messages to identify the received message or the sent message. For example, the user may attach the received message to a forwarded message. The message analyzer 114 examines the forwarded message, opens the attachment and identifies the received message. Accordingly, the forwarded message and the received message have a conversationally relationship. As a result, the message analyzer 114 adds the forwarded message to the message trail 118. As another example, another user may attach the sent message as a reply to the user. The message analyzer 114 examines the reply, opens the attachment and identifies the sent message. Accordingly, the reply and the sent message are conversational related. Hence, the message analyzer 114 adds the reply to the message trail 118.

According to various embodiments of the present invention, the message analyzer 114 creates the message trail 118 (e.g., a forward message trail or a backward message trail) for the message 120 (e.g., the received message or the sent message) using the related message 122. In one embodiment, the related message 122 includes duplicated text (e.g., cut and pasted text) from the message 120. In another embodiment, the related message 122 and the message 120 are associated with the same cluster (e.g., concept based cluster). In yet another embodiment, the related message 122 includes the message 120 as an attachment.

Subsequently, the message analyzer 114 proceeds to examine the message database 116 to identify one or more messages that are conversationally related to the related message 122. For example, the message analyzer 114 identifies one or more messages that include duplicated text from the related message 122, are associated with the same cluster (i.e., similar concept) and/or include the related message 122 as an attachment and then, adds the one or more messages to the message trail 118. In other words, the message analyzer 114 continues to add conversationally related messages to the message trail 118 until no more messages may be added.

The message trail 118 may form a portion of a complete information trail that provides clues regarding a particular topic of interest. In one embodiment, the message trail 118 may be archived in a repository by archival software (e.g., SYMANTEC Enterprise Vault). In another embodiment, the message trail 118 may be accessed by one or more e-discovery tools (e.g., SYMANTEC Enterprise Vault Discovery Accelerator, SYMANTEC Enterprise Vault Compliance Accelerator and/or the like) during litigation or early case management. Additionally, the message trail 118 may be used to enhance human resource investigations (e.g., hiring decisions) as well as corporate policy and/or regulatory compliance. Furthermore, the message trail 118 may also improve data leakage prevention and detection. Accordingly, the message trail 118 facilitates end-to end information risk management solutions.

Figure 2:
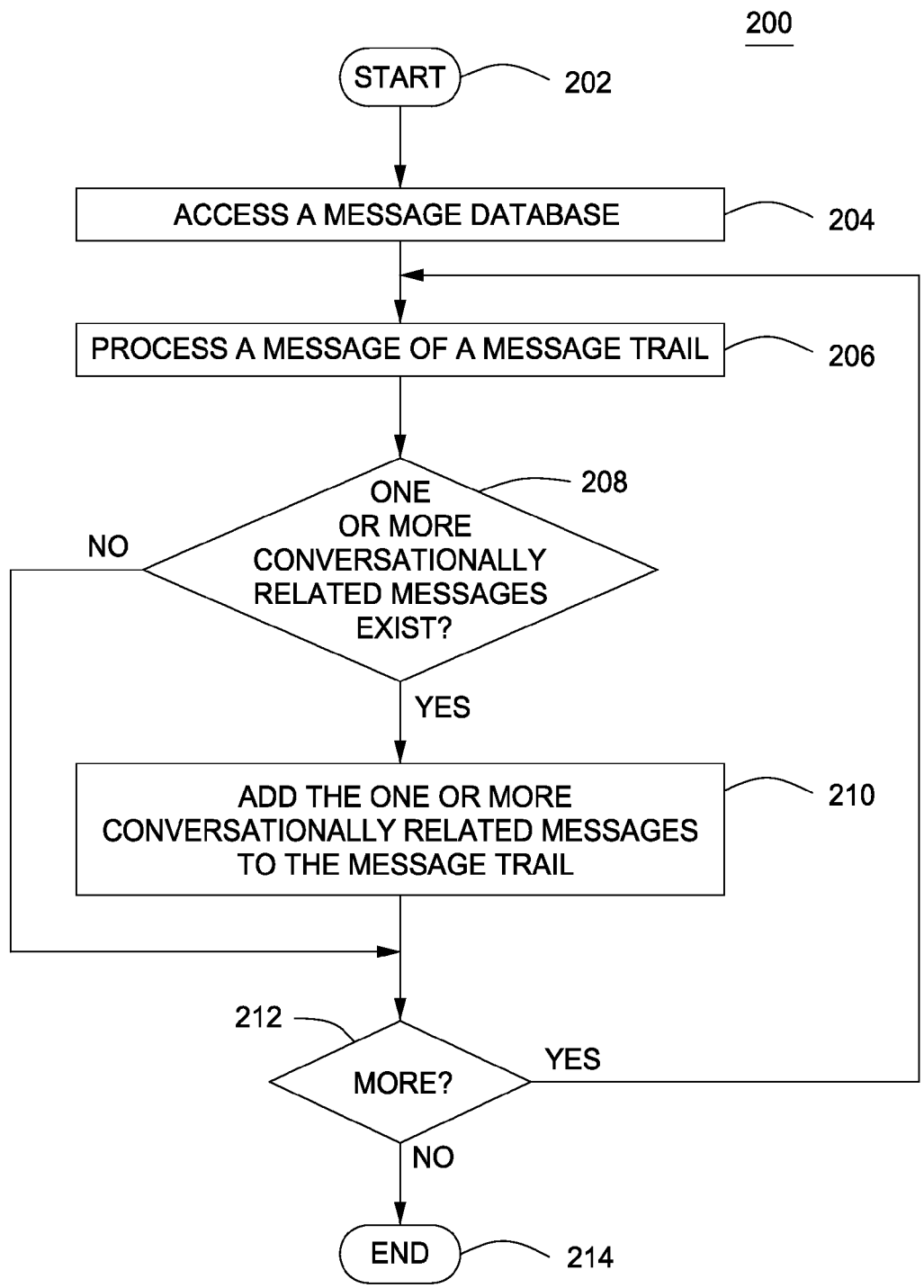
FIG. 2 is a flow diagram of a method for providing a message trail of conversationally related messages according to one or more embodiments of the present invention.

FIG. 2 is flow diagram of a method 200 for providing a message trail of conversationally related messages according to one or more embodiments of the present invention. The method 200 starts at step 202 and proceeds to step 204.

At step 204, a message database is accessed. At step 206, a message of a message trail is processed. At step 208, a determination is made as to whether one or more conversationally related messages exist in the message database. If one or more conversationally related messages exist, then the method 200 proceeds to step 210. At step 210, the one or more conversationally related messages are added to the message trail. If there are no more conversationally related messages, the method 200 proceeds to step 212. At step 212, a determination is made as to whether there are any more messages in the message trail which need to be processed for determining the one or more conversationally related messages. If it is determined that there are one or more such messages in the message trail, the method 200 returns to step 206. If it is determined that there no more messages in the message trail to be processed, the method 200 proceeds to step 214. At step 214, the method 200 ends.

Figure 3:
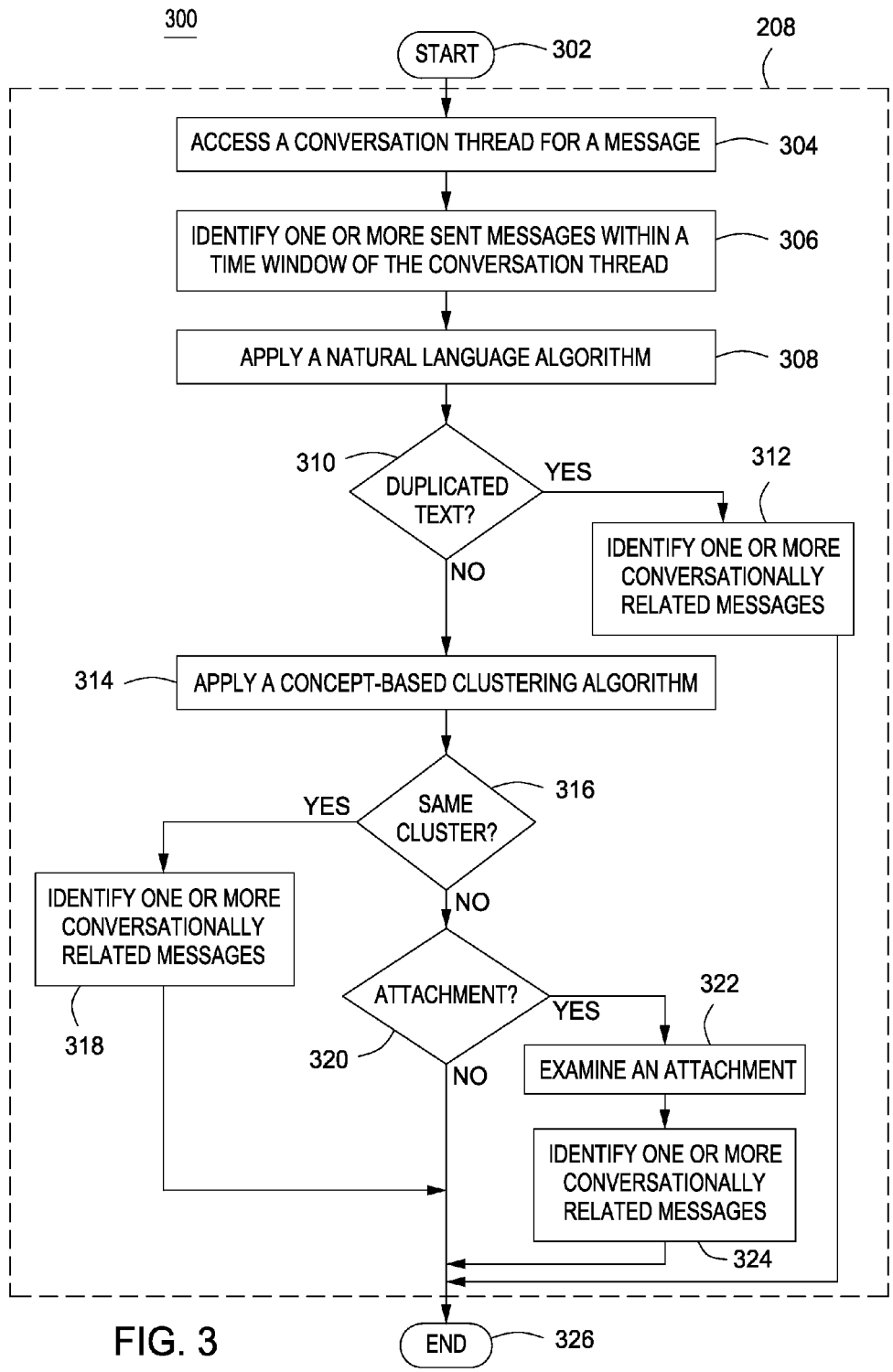
FIG. 3 is a flow diagram of a method for identifying one or more conversationally related messages for a received message to create a message trail according to one or more embodiments of the present invention.

FIG. 3 is flow diagram of a method 300 for identifying one or more conversationally related messages for a received message to create a message trail (i.e., a forward message trail) according to one or more embodiments of the present invention. The method 300 starts at step 302 and proceeds to step 304. In one embodiment, the method 300 is an embodiment of step 208 of the method 200 as illustrated in FIG. 2.

At step 304, a conversation thread associated with a received message is accessed. For example, various properties (e.g., MAPI_CONVERSATION_INDEX property, a SMTP In-ReplyTo property and/or the like) may be utilized to create the conversation thread. As such, the message trail initially includes the conversation thread. At step 306, one or more sent messages within a time window of the conversation thread are identified (i.e., after the received message). At step 308, a natural language algorithm (e.g., n-grams, shingling, paragraph-based hashing and/or the like) is applied to the one or more sent messages. At step 310, a determination is made as to whether the identified one or more sent messages include duplicated text (e.g., text duplicated from the received message). If any sent message of the identified one or more sent message includes duplicated text, the method 300 proceeds to step 312. At step 312, one or more conversationally related messages with duplicated text are identified. After step 312, the method 300 proceeds to step 326. Subsequently, the one or more conversationally related messages are added to the message trail. If none of the one or more sent message includes duplicated text, the method 300 proceeds to step 314.

At step 314, a concept-based clustering algorithm is applied to the one or more sent messages and the received message. At step 316, a determination is made as to whether any sent message of the one or more sent messages is in a same cluster as the received message. If any sent message of the one or more sent messages is in the same cluster as the received message, the method 300 proceeds to step 318. At step 318, one or more conversationally related messages in the same cluster as the received message are identified. After step 318, the method 300 proceeds to step 326. Subsequently, the one or more conversationally related messages are added to the message trail. If none of the one or more sent messages are in the same cluster as the received message, the method 300 proceeds to step 320.

At step 320, a determination is made as to whether any sent message of the one or more sent messages include an attachment. If any sent message of the one or more sent messages includes an attachment, the method 300 proceeds to step 322. At step 322, the attachment of the any sent message of the one or more sent messages is examined for a copy of the received message. At step 324, one or more conversationally related messages that include the received message as an attachment are identified. Subsequently, the one or more conversationally related messages are added to the message trail. At step 326, the method 300 ends.

Figure 4:
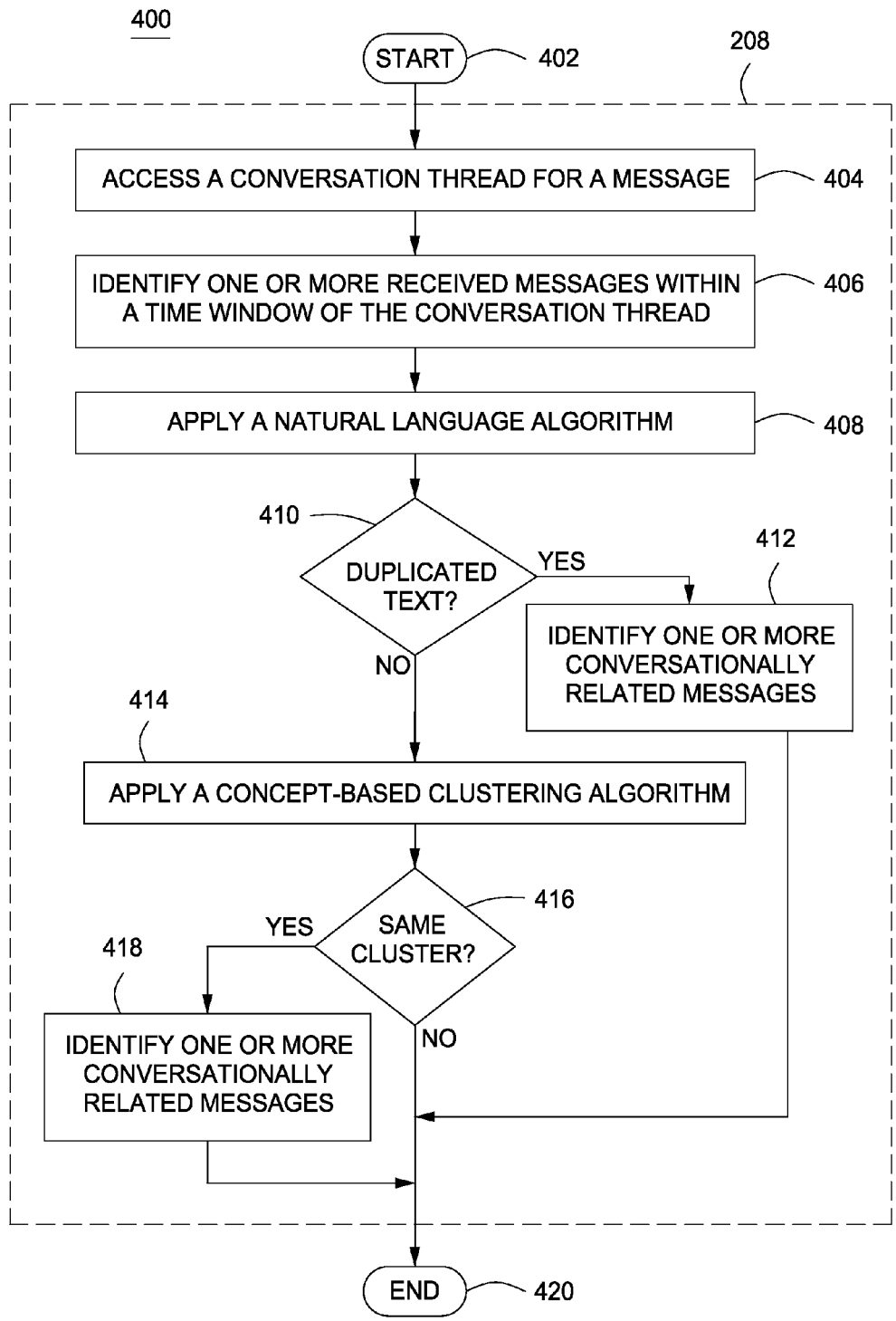
FIG. 4 is a flow diagram of a method for identifying one or more conversationally related messages for a sent message to create a message trail according to one or more embodiments of the present invention.

FIG. 4 is a flow diagram of a method 400 for identifying one or more conversationally related messages for a sent message to create a message trail (i.e., a backward message trail) according to one or more embodiments of the present invention. The method 400 starts at step 402 and proceeds to step 404. In one embodiment, the method 400 is an embodiment of step 208 of the method 200 as illustrated in FIG. 2. In another embodiment, the method 400 is performed after step 326 of the method 300 as illustrated in FIG. 3. For instance, the method 400 may be used to determine if a particular message in the conversation thread includes cut and pasted text from a received message from a sender of the particular message.

At step 404, a conversation thread associated with a sent message is accessed. For example, various properties (e.g., MAPI_CONVERSATION_INDEX property, a SMTP In-ReplyTo property and/or the like) may be utilized to access the conversation thread. As such, the message trail initially includes the conversation thread. Furthermore, the sent message is a first sent message of the conversation thread. At step 406, one or more received messages within a time window of the conversation thread (i.e., the first sent message in the conversation thread) are identified. Accordingly, the time window for the message trail may be backwards (i.e. before a sent date and/or time of the first sent message of the conversation thread).

At step 408, a natural language algorithm is applied to the one or more received messages. At step 410, a determination is made as to whether the identified one or more received messages include duplicated text (e.g., text duplicated from the sent message). If any received message of the one or more received message includes duplicated text, the method 400 proceeds to step 412. At step 412, one or more conversationally related messages with duplicated text are identified. After step 412, the method 400 proceeds to step 420. Subsequently, the one or more conversationally related messages are added to the message trail. If none of the one or more received messages includes duplicated text, the method 400 proceeds to step 414.

At step 414, a concept-based clustering algorithm is applied to the one or more received messages and the sent message. At step 416, a determination is made as to whether any received message of the one or more received messages is in a same cluster as the sent message. If any received message of the one or more received messages are in the same cluster as the sent message, the method 400 proceeds to step 418. At step 418, one or more conversationally related messages in the same cluster as the sent message are identified. Subsequently, the one or more conversationally related messages are added to the message trail. If none of the one or more received messages are in the same cluster as the sent message, the method 400 proceeds to step 420. At step 420, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for providing a message trail of conversationally related messages, comprising:
processing a plurality of messages in a message database, wherein processing the plurality of messages comprises examining the plurality of messages within a pre-defined time window;
identifying at least two conversationally related messages of the plurality of messages by applying a natural language algorithm and a concept based clustering algorithm on the plurality of messages, wherein the natural language algorithm comprises at least one of n-grams, shingling, and paragraph-based hashing to identify duplicated text, and wherein the concept based clustering algorithm comprises creating one or more clusters based on message concept; and
generating a message trail from the at least two conversationally related messages of the plurality of messages.

2. The method of claim 1, wherein the at least two conversationally related messages of the plurality of messages comprises at least one received message and at least one sent message.

3. The method of claim 1, wherein the at least two conversationally related messages of the plurality of messages comprises at least one sent message that comprises at least one received message as at least one attachment.

4. The method of claim 1, wherein the at least two conversationally related messages of the plurality of messages comprises at least one received message that comprises at least one sent message as at least one attachment.

5. The method of claim 1, wherein the pre-defined time window is based on at least one of at least one sent message or at least one received message.

6. The method of claim 1, wherein processing the plurality of messages further comprises examining a journal to determine at least one message that is within the pre-defined time window of at least one of at least one sent message or the least one received message.

7. The method of claim 1, wherein processing the plurality of messages further comprises examining the message database to determine at least one message that is within the pre-defined time window of at least one of at least one sent message or at least one received message.

8. The method of claim 1, wherein natural language algorithm is configured to identify at least one message having duplicated text from at least one of at least one sent message or at least one received message.

9. The method of claim 1, wherein the concept based clustering algorithm is configured to identify at least one message in a same cluster as at least one of at least one sent message or at least one received message.

10. The method of claim 1, wherein identifying the at least two conversationally related messages of the plurality of messages further comprises coupling the at least two conversationally related messages to create a message trail.

11. An apparatus for providing a message trail of conversationally related messages, comprising:
a memory comprising a message database comprising a plurality of messages;
a message analyzer configured to:
process the plurality of messages by examining the plurality of messages within a pre-defined time window, and
identify at least two conversationally related messages of the plurality of messages by applying a natural language algorithm and a concept based clustering algorithm on the plurality of messages, wherein the natural language algorithm comprises at least one of n-grams, shingling, and paragraph-based hashing to identify duplicated text, and wherein the concept based clustering algorithm comprises creating one or more clusters based on message concept, and
generate a message trail from the at least two conversationally related messages of the plurality of messages.

12. The apparatus of claim 11, wherein the message analyzer creates a message trail from the at least two conversationally related messages.

13. The apparatus of claim 11, wherein the message analyzer examines the message database to determine at least one message that is within the pre-defined time window of at least one of at least one sent message or at least one received message.

14. The apparatus of claim 11, wherein the natural language algorithm is configured to identify at least one message having duplicated text from at least one of a sent message or a received message.

15. The apparatus of claim 11, wherein the concept based clustering algorithm is configured to identify at least one message in a same cluster as at least one of a sent message or a received message.

16. A system for providing a message trail of conversationally related messages, comprising:
a storage, comprising:
a message database comprising a plurality of messages; and
a server, comprising:
a message analyzer configured to:
access the message database,
examine the plurality of messages within a pre-defined time window, and
identify at least two conversationally related messages of the plurality of messages by applying a natural language algorithm and a concept based clustering algorithm on the plurality of messages, wherein the natural language algorithm comprises at least one of n-grams, shingling, and paragraph-based hashing to identify duplicated text, and wherein the concept based clustering algorithm comprises creating one or more clusters based on message concept, and generate a message trail from the at least two conversationally related messages of the plurality of messages.

17. The system of claim 16, wherein the message analyzer creates a message trail from the at least two conversationally related messages.

18. The system of claim 16, wherein the message analyzer examines the message database to collect at least one message that is within the pre-defined time window of at least one of at least one received message or at least one sent message.

19. The system of claim 16, wherein the natural language algorithm is configured to identify the at least one message having duplicated text from at least one of at least one received message or at least one sent message.

20. The system of claim 16, wherein the concept based clustering algorithm is configured to identify at least one message in a same cluster as at least one of at least one received message or at least one sent message.

* * * * *